US010195565B2

(12) United States Patent
Heisel et al.

(10) Patent No.: US 10,195,565 B2
(45) Date of Patent: Feb. 5, 2019

(54) REMOVAL OF HYDROGEN SULFIDE AND SULFUR RECOVERY FROM A GAS STREAM BY CATALYTIC DIRECT OXIDATION AND CLAUS REACTION

(71) Applicant: PROSERNAT, Puteaux (FR)

(72) Inventors: Michael Heisel, Pullach (DE); Benoit Mares, Montesson (FR)

(73) Assignee: PROSERNAT, Puteaux (FR)

( * ) Notice: Subject to any disclaimer, the term of this patent is extended or adjusted under 35 U.S.C. 154(b) by 0 days.

(21) Appl. No.: 15/539,257

(22) PCT Filed: Dec. 23, 2015

(86) PCT No.: PCT/EP2015/081129
§ 371 (c)(1),
(2) Date: Jun. 23, 2017

(87) PCT Pub. No.: WO2016/102652
PCT Pub. Date: Jun. 30, 2016

(65) Prior Publication Data
US 2018/0008930 A1 Jan. 11, 2018

(30) Foreign Application Priority Data

Dec. 24, 2014 (EP) .................................... 14307188

(51) Int. Cl.
*C10L 3/10* (2006.01)
*C01B 17/04* (2006.01)
(Continued)

(52) U.S. Cl.
CPC ......... *B01D 53/8612* (2013.01); *B01D 53/52* (2013.01); *B01D 53/869* (2013.01);
(Continued)

(58) Field of Classification Search
CPC . C01B 17/04; C01B 17/0404; C01B 17/0413; C01B 17/0426; C01B 17/043; C01B 17/0452; C01B 17/0456
See application file for complete search history.

(56) References Cited

U.S. PATENT DOCUMENTS 2,919,976 A 1/1960 Feagan, Jr.
4,756,900 A * 7/1988 Pendergraft ........ C01B 17/0413
423/574.1
(Continued)

FOREIGN PATENT DOCUMENTS

CN 101791517 A 8/2010
DE 19510915 A1 9/1996
(Continued)

OTHER PUBLICATIONS

International Search Report dated Mar. 21, 2016 issued in corresponding PCT/EP2015/081129 application (5 pages).
(Continued)

*Primary Examiner* — Timothy C Vanoy
(74) *Attorney, Agent, or Firm* — Millen, White, Zelano and Branigan, P.C.

(57) ABSTRACT

A process for the removal of hydrogen sulfide and sulfur recovery from a $H_2S$-containing gas stream by catalytic direct oxidation and Claus reaction through two or more serially connected catalytic reactors, wherein a specific control of the oxygen supplement is operated. The control and improvement of the process is obtained by complementing, in each major step of the process, the $H_2S$-containing gas stream by a suitable flow of oxygen, namely before the $H_2S$-containing gas stream enters the Claus furnace, in the first reactor of the process and in the last reactor of the process. Especially in application in a SubDewPoint sulfur recovery process the $H_2S/SO_2$ ratio is kept constant also during switch-over of the reactors R1 and R by adding the last auxiliary oxygen containing gas directly upstream the
(Continued)

last reactor R so that the $H_2S/SO_2$ ratio can follow the signal of the ADA within a few seconds.

21 Claims, 2 Drawing Sheets

(51) Int. Cl.
*B01D 53/52* (2006.01)
*B01D 53/86* (2006.01)
*B01D 53/90* (2006.01)

(52) U.S. Cl.
CPC .......... *B01D 53/90* (2013.01); *C01B 17/0404* (2013.01); *C01B 17/0413* (2013.01); *C01B 17/0426* (2013.01); *C01B 17/0447* (2013.01); *C10L 3/103* (2013.01); *B01D 2251/11* (2013.01); *B01D 2255/2092* (2013.01); *B01D 2255/20707* (2013.01); *B01D 2257/30* (2013.01); *B01D 2257/304* (2013.01); *B01D 2257/308* (2013.01); *B01D 2258/05* (2013.01); *C10L 2290/58* (2013.01); *C10L 2290/60* (2013.01)

(56) References Cited

U.S. PATENT DOCUMENTS

| | | |
|---|---|---|
| 4,957,724 A | 9/1990 | Marold et al. |
| 4,988,494 A | 1/1991 | Lagas et al. |
| 5,028,409 A | 7/1991 | Gitman |
| 5,676,921 A | 10/1997 | Heisel et al. |
| 5,965,100 A | 10/1999 | Khanmamedov |
| 6,287,535 B1 | 9/2001 | Schendel |

FOREIGN PATENT DOCUMENTS

| | | |
|---|---|---|
| EP | 0242006 A1 | 10/1987 |
| EP | 0672618 A1 | 9/1995 |
| SU | 1611851 A1 | 12/1990 |
| WO | 00/59826 A1 | 10/2000 |
| WO | 03/014015 A1 | 2/2003 |

OTHER PUBLICATIONS

Written Opinion of the International Searching Authority dated Mar. 21, 2016 issued in corresponding PCT/EP2015/081129 application (6 pages).

R.E. Heigold et al., "Pine River Uses Four-Converter MCRC Subdewpoint Process for Sulfur Recovery", Oil & Gas Journal (Sep. 12, 1983) pp. 156-160.

English Abstract of DE 19510915 A1 published Sep. 26, 1996.

English Abstract of CN 101791517 A published Aug. 4, 2010.

\* cited by examiner

REMOVAL OF HYDROGEN SULFIDE AND SULFUR RECOVERY FROM A GAS STREAM BY CATALYTIC DIRECT OXIDATION AND CLAUS REACTION

The present invention relates to a process for the removal of hydrogen sulfide and sulfur recovery from a gas stream by catalytic direct oxidation and Claus reaction. More specifically, the present invention relates to the control and the optimization of a process for the removal of hydrogen sulfide and sulfur recovery from a gas stream by catalytic direct oxidation and Claus reaction.

BACKGROUND OF THE INVENTION

The presence of sulfur in industrial gases causes significant environmental problems, and therefore, strict requirements are in place to remove sulfur from gas streams, in particular in petroleum refinery and natural gas plants but also in biogas plants, from $H_2S$ scrubbers, etc.

Sulfur recovery units are thus installed to convert poisonous sulfur compounds, as $H_2S$ into harmless elemental sulfur.

A widespread method for desulfurization of sulfur-containing gas streams, in particular from gas streams in petroleum refineries and natural gas plants is the Claus process. The Claus process is long-known and operates in two major process steps. The first process step is carried out in a furnace where hydrogen sulfide is converted to elemental sulfur and sulfur dioxide at temperatures of approximately 900 to 1400° C. by the combustion of about one third of the hydrogen sulfide in the gas stream. The so obtained sulfur dioxide reacts with hydrogen sulfide in the furnace to elemental sulfur. Thus, in this first step of the Claus process, about 60 to 70% of the $H_2S$ in the feed gas are converted.

To achieve higher sulfur recovery rates two to four catalytic steps follow where the Claus reaction according to Eq. 1:

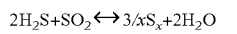

$$2H_2S + SO_2 \leftrightarrow 3/xS_x + 2H_2O \qquad \text{Eq. 1}$$

continues.

A known process, in which $H_2S$ and $SO_2$ are converted to elementary sulfur, with good desulfurization efficiency, is, for example, a Claus process with four serially connected catalytic reactors. To further increase the desulfurization efficiency of over 99% Claus process with four serially connected catalytic reactors with the last two being operated below the sulfur dew point. As a consequence, the chemical equilibrium is shifted more strongly in the direction of reaction of $H_2S$ and $SO_2$ to elementary sulfur than in a conventional Claus process in which temperatures are not permitted to fall below the sulfur dew point in any of the catalytic reactors.

The reason for this is that a major part of the formed sulfur is removed from the stream by adsorption on the catalyst and thus the equilibrium of the reaction of Eq. 1 is shifted by the sulfur elimination to the right side of the equation.

The catalyst is inactivated by the sulfur condensation so that it must be regenerated after a certain time. To maintain a continuous operation of the plant, of the four reactors the first is always operated as a conventional Claus reactor, one is regenerated, while the other two are run below the sulfur dew point. For regeneration, the gas stream, for example, is heated up by means of gas-gas heat exchangers so that by passing the heated gas over the catalyst loaded with sulfur, the sulfur is evaporated.

If the sulfur loading of the catalyst reaches a certain level, an automatic switching of the reactor to the regeneration phase and a corresponding switching of the two reactors working below the sulfur dew point take place.

Such a process is described, for example, in Oil & Gas Journal of Sep. 12, 1983, on pages 156-160.

The known process has the great cost disadvantage that at least four Claus reactors, of which two in each case are operated below the S dew point, are necessary to achieve an S recovery of over 99%.

An improvement of this process has been disclosed in U.S. Pat. No. 4,957,724 which involves the use of two serially connected reactors, both reactors containing an active catalyst for the direct oxidation of $H_2S$ to sulfur, wherein the first reactor is operated above the sulfur dew point, and the second reactor is operated below the sulfur dew point. This process however involves drastic changes of the reaction temperature between the two reactors and even between the two reaction zones of the reactors, which ends up being significantly cost effective.

In addition, the processes of the prior art fail to compensate the variation of concentration in $H_2S$ in the composition of the $H_2S$-containing gas feed, and the possible perturbations usually occurring throughout the process such as a variation of the temperatures in the reactors or loss of sulfur conversion due to partial deactivation of the catalyst, that lead to drift of the desulfurization efficiency. Indeed, when a sulfur recovery unit is operating, various operational conditions can have an impact on the overall sulfur recovery.

There remains a need for a sulfur recovery process that could be controlled in real time to avoid any drift of the desulfurization efficiency and therefore improves the overall desulfurization efficiency.

U.S. Pat. No. 2,919,976 for example focuses on the control of the temperature in the different reactors of a Claus unit and discloses the introduction of oxygen at the entry of the reactors in order to generate enough heat in the converters without having to use additional heaters. In this document, an $H_2S/SO_2$ controller can be used to control $H_2S/SO_2$ volumetric ratio of the feed and introduce $H_2S$ or $SO_2$ to keep the $H_2S/SO_2$ volumetric ratio constant in the feed. However, this document fails to provide any solution to the drift of the desulfurization efficiency that result from the competitive reactions that take place in the reactors (hydrolysis of COS and $CS_2$, oxidation of $H_2S$, Claus reaction) and the variations of operational conditions during the whole process. U.S. Pat. No. 2,919,976 only ensures that the gas entering the process has the proper $H_2S/SO_2$ volumetric ratio. This cannot guarantee that this ratio will not vary during the different steps of the process.

U.S. Pat. No. 5,965,100 discloses a process for recovering sulfur involving a furnace operating with sub stoichiometric proportions of oxygen to avoid sulfate formation that would poison the catalyst used in the first reactor, and discloses the use of two additional rectors operating with specific catalysts having a spinel structure and with an air inlet. These special spinel structure catalysts favor oxidation reactions in the reactors. Therefore, U.S. Pat. No. 5,965,100 discloses to control the $H_2S/SO_2$ volumetric ratio at the outlet of each reactors and to adjust the air entering each reactors so as to keep the overall oxidation just below or at the stoichiometric level. It is therefore "expected" in U.S. Pat. No. 5,965,100 that the gas stream exiting the process will have a $H_2S/SO_2$ volumetric ratio of 2:1. However, as previously explained, it is not possible to anticipate that the $H_2S/SO_2$ volumetric ratio will remain at the target value of 2:1 during the whole process considering the various reactions that take place in the reactors and since variations in operational conditions will impact the equilibrium of each reaction. In addition, in U.S. Pat. No. 5,965,100, when a variation in the ratio is observed at the outlet of the second reactor, air is adjusted at the entry of the furnace. This results in a long time period (at least 5 minutes to hours depending on the size of the unit) before the adjustment of air in the furnace finally improves correctly the $H_2S/SO_2$ ratio in the second reactor. Finally, the unit disclosed in U.S. Pat. No. 5,965,100 is costly since it involves at least three $H_2S/SO_2$ controllers and specific catalysts.

U.S. Pat. No. 5,028,409 discloses a method for recovering sulfur from gaseous materials containing $H_2S$ involving a specific combustion zone capable of burning pollutants such as ammonia. Each of the reaction zones contains a reheating unit in which air can be supplied to provide enough heat to the catalytic bed, a catalytic zone, a flow rate control, a temperature control and a $H_2S/SO_2$ ratio control. Document U.S. Pat. No. 5,028,409 intends to maintain the $H_2S/SO_2$ ratio constant during the whole process. However, this document teaches to introduce air into the reheating units of each reaction zones and not directly in the reactors. When doing so, the air is burnt in the reheaters to provide heat to the reactor, and the remaining amount of oxygen available to react with $H_2S$ in the reactors cannot be precisely controlled. Here again, this prior art patent intends to maintain the $H_2S/SO_2$ ratio constant during the whole process but provides no convincing solutions to do so. In addition, the resulting unit is incredibly costly considering all the controls of temperature, flow rate, $H_2S/SO_2$ ratio necessary in each catalytic zone.

Therefore, there remains a need in industry for a reliable controlled Claus process with a high operational availability and cheap in operation. The process should in particular provide a very high desulfurization efficiency (both conversion and selectivity) which is stable throughout the process, and that compensate any variation of the $H_2S/SO_2$ ratio at the outlet of the process with high reactivity, in particular when the switch-over of the reactors is needed for catalyst regeneration. These goals can be obtained thanks to the process of the claimed invention.

The object of the present invention to provide a process for the removal of hydrogen sulfide ($H_2S$) from a $H_2S$-containing gas stream through two or more serially connected catalytic reactors, which process comprises:

a) mixing the $H_2S$-containing gas stream with a main oxygen-containing gas stream to obtain a gas stream containing both $H_2S$ and oxygen, b) introducing the obtained gas stream containing both $H_2S$ and oxygen into a furnace whereby a gas stream depleted in $H_2S$ is obtained, c) transferring the gas stream depleted in $H_2S$ to a sulfur condenser to obtain a gas stream depleted in sulfur, d) introducing the gas stream depleted in sulfur, optionally together with a first auxiliary oxygen-containing gas stream, into a first catalytic reactor R1 containing a catalyst system which catalyzes the Claus reaction of $H_2S$ with sulfur dioxide ($SO_2$), the hydrolysis of COS and $CS_2$ and optionally direct oxidation of $H_2S$ with oxygen to sulfur, said reactor being operated at a maximum temperature $T^{R1}_{max}$ between 290 and 350° C., whereby a gas stream depleted in $H_2S$ is obtained, e) transferring the gas stream depleted in $H_2S$ to a sulfur condenser to obtain a gas stream depleted in sulfur, f) optionally introducing the gas stream depleted in sulfur obtained from reactor R1 through a series of reactors and condensers, preferably 1 or 2, each reactor containing a catalyst system which catalyzes the Claus reaction of $H_2S$ with sulfur dioxide ($SO_2$) before reaching the last reactor R of the process, g) introducing the gas stream depleted in sulfur together with a last auxiliary oxygen-containing gas stream into the last catalytic reactor R containing a catalyst system which catalyzes the Claus reaction of $H_2S$ with sulfur dioxide ($SO_2$) and the direct oxidation of $H_2S$ with oxygen to sulfur, said reactor being operated at a maximum temperature $T^R_{max}$ below the maximum temperature $T^{R1}_{max}$ of reactor R1, whereby a gas stream depleted in $H_2S$ is obtained, h) optionally transferring the gas stream depleted in $H_2S$ to a sulfur condenser to obtain a gas stream depleted in sulfur, i) measuring the volumetric ratio of $H_2S/SO_2$ at the exit of the last catalytic reactor R, wherein the flow rate of oxygen in the main oxygen-containing gas stream and in the optional auxiliary oxygen-containing gas streams represents 96 to 99.9 vol. % of the total flow rate of the oxygen supplemented in the process, preferably 98 to 99.8 vol. %, and more preferably 98.5 to 99.5 vol % the flow rate of oxygen in the last auxiliary oxygen-containing gas stream represents 0.1 to 4 vol. % of the total flow rate of the oxygen supplemented in the process, preferably 0.1 to 2 vol. %, and more preferably 0.5 to 1.5 vol. % and wherein the flow rate of oxygen in the last auxiliary oxygen-containing gas stream is adjusted depending on the value of the volumetric ratio of $H_2S/SO_2$ measured at the exit of the last catalytic reactor R in step i) so that the volumetric ratio of $H_2S/SO_2$ measured in step i) remains between 1.9 and 2.2.

It is indeed of the merit of the inventors to have discovered that it was possible to control and improve a Claus process by complementing, in each major step of the process, the $H_2S$-containing gas stream by a suitable flow of oxygen. The oxygen implementation should at least be operated before the $H_2S$-containing gas stream enters the Claus furnace and in the last reactor of the process. It is indeed possible with such control to significantly reduce the period of time between the measurement of a deviation from the optimum $H_2S/SO_2$ ratio of 2 and the reaction to this deviation by adjusting the oxygen both at entry of the system and in the last reactor. This provides a great reactivity to the whole process and an improvement in sulfur conversion since the period of time where the $H_2S/SO_2$ ratio is outside the optimum range of 1.9 to 2.2 is significantly reduced.

Step a

In the first step of the process of the invention, a $H_2S$-containing gas stream (acid gas) is mixed with a main oxygen-containing gas stream to obtain a gas stream containing both $H_2S$ and oxygen that will enter the Claus furnace.

In the furnace, the two following oxidation reactions of $H_2S$ will take place:

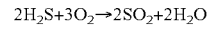

$$2H_2S+3O_2 \rightarrow 2SO_2+2H_2O$$

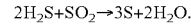

$$2H_2S+SO_2 \rightarrow 3S+2H_2O.$$

The flow rate of oxygen in the main oxygen-containing gas stream and in the optional auxiliary oxygen-containing gas streams represents 96 to 99.9 vol. % of the total flow rate of the oxygen supplemented in the process, preferably 98 to 99.8 vol. %, and more preferably 98.5 to 99.5 vol %.

The flow rate of oxygen in the main oxygen-containing gas stream and in the optional auxiliary oxygen-containing gas streams, while always representing 96 to 99.9 vol. % of the flow rate of the total oxygen-containing gas stream supplemented in the process, can preferably be optimized by ensuring a volumetric ratio of $H_2S$ in the $H_2S$-containing gas stream/$O_2$ in the main oxygen-containing gas stream be above or at the stoichiometric value of the reactions operated in the furnace of 2, preferably from 2.002 to 2.5, more preferably from 2.002 to 2.2, and even more preferably from 2.002 to 2.08.

Of course, when impurities that react with oxygen are present in the $H_2S$-containing gas stream (acid gas), flow rate of oxygen in the main oxygen-containing gas stream should be adjusted by the skilled person so the oxygen available to react with $H_2S$ in the furnace remains below or at the stoichiometric value of the reactions operated in the furnace (corresponding to a volumetric ratio of $H_2S$ in the $H_2S$-containing gas stream/$O_2$ in the main oxygen-containing gas stream of 2 or more).

This is preferably done by measuring the flow rate of $H_2S$ in the $H_2S$-containing gas stream entering the system and defining the flow rate of oxygen in the main oxygen-containing gas flow so that the flow rate of oxygen in the main oxygen-containing gas stream be proportional to the flow rate of $H_2S$ in the $H_2S$-containing gas stream of a proportionality factor (a), said factor (a) being calculated so that the volumetric ratio of $H_2S$ in the $H_2S$-containing gas stream/$O_2$ in the oxygen-containing gas stream be above the stoichiometric value of the reactions operated in the furnace of 2 (corresponding to a maximum of 1 mole of $O_2$ for 2 moles of $H_2S$).

The $H_2S$-containing gas stream entering the process of the invention preferably contains from 35 to 99.9 vol. % of $H_2S$, and preferably from 40 to 99 vol. % $H_2S$, more preferably 50 to 98 vol. % $H_2S$.

The oxygen-containing gas stream preferably used in the process of the invention is the air for obvious economic reasons, thus containing around 20 vol. % of $O_2$ but could also be pure $O_2$.

Thus, for example if the $H_2S$-containing gas stream entering the process contains 70 vol. % of $H_2S$, and the oxygen-containing gas stream contains 20 vol. % of $O_2$, the proportionality factor (a) will be max 1.75 so that the oxygen-containing gas flow be max 1.75 times the $H_2S$-containing gas flow.

In a preferred embodiment of the present invention, in order to increase the productivity of the Claus reaction in the furnace, the volumetric ratio of $H_2S$ in the $H_2S$-containing gas stream/$O_2$ in the main oxygen-containing gas stream is maintained above the stoichiometric value of the reactions operated in the furnace of 2 during the whole process, in particular between 2.002 to 2.5, preferably 2.002 to 2.2, more preferably 2.002 to 2.08.

Step b

Step b) of the claimed process involves the introduction of the obtained gas stream containing both $H_2S$ and oxygen into a furnace where $H_2S$ is converted to elemental sulfur and $SO_2$. The gas stream depleted in $H_2S$ also contains unreacted $H_2S$ as well as impurities formed in the furnace such as COS and $CS_2$.

The furnace is preferably operated at a temperature of 900° C. to 1400° C., more preferably 1100° C. to 1300° C.

Step c

The claimed process further includes a step c) where the gas stream depleted in $H_2S$ leaving the furnace is cooled by passing through a condenser where liquid sulfur is condensed and withdrawn and a gas stream depleted in sulfur is recovered.

A gas stream depleted in sulfur is thus obtained, wherein preferably 50 to 70 vol. % of the $H_2S$ contained in the $H_2S$-containing gas stream entering the process is converted into sulfur.

Step d

The gas stream depleted in sulfur obtained in step c) will then be introduced, optionally together with a first auxiliary oxygen-containing gas stream into a first catalytic reactor R1 containing a catalyst system which catalyzes the Claus reaction of $H_2S$ with sulfur dioxide ($SO_2$), the hydrolysis of COS and $CS_2$ and optionally the direct oxidation of $H_2S$ with oxygen to sulfur.

Within the meaning of the invention, the first reactor is the first Claus reactor of the process in which the $H_2S$-containing gas stream enters.

The gas stream depleted in sulfur obtained in step c) contains impurities formed in the furnace such as COS and $CS_2$ which need to be eliminated. The first reactor R1 of the process of the invention aims at converting a maximum amount of COS and $CS_2$ to $H_2S$ by hydrolysis. However, hydrolysis of COS and $CS_2$ to $H_2S$ can only be achieved when the catalyst system of reactor R1 reaches a maximum temperature $T^{R1}_{max}$ of 290° C. to 350° C. This temperature in reactor R1 can be achieved when the gas stream depleted in sulfur obtained in step c) reaches a temperature of about 220-250° C., depending on $H_2S$ and $SO_2$ concentration in vapor phase. When the gas stream at 220-250° C. reacts with the Claus catalyst, the exothermic Claus reaction is conducted, therefore increasing the temperature in the reactor to the desired maximum temperature of 290-350° C. ensuring hydrolysis.

In order for the gas stream depleted in sulfur obtained in step c) to reach a temperature between 220 and 250° C., it may be necessary to introduce a heater between the condenser of step c) and the reactor 1 of step d) in order to pre-heat the gas stream depleted in sulfur obtained in step c) up to a temperature of about 230° C.

Therefore, in a preferred embodiment, the gas stream depleted in sulfur obtained in step c) further passes through a heater located between the condenser of step c) and the reactor 1 of step d).

To further increase the temperature of the gas stream depleted in sulfur obtained in step c) in a simple and economic manner, the process of the invention introduces first auxiliary oxygen-containing gas stream into reactor R1 to react with $H_2S$ through direct oxidation according to Eq. 2.

$$2H_2S+O_2 \leftrightarrow 2/xS_x+2H_2O+\text{heat} \qquad \text{Eq. 2}$$

This reaction produces the heat necessary to operate the reactor R1 at the desired maximum temperature $T^{R1}_{max}$ of 290 to 350° C., preferably 310 to 340° C., and more preferably 315 to 330° C. so that the maximum amount of COS and $CS_2$ be eliminated by hydrolysis at this stage.

In a preferred embodiment, the optional first auxiliary oxygen-containing gas stream can also be introduced in a heater between the condenser of step c) and the reactor 1 of step d) in order to be pre-heated.

The more oxygen is added to reactor R1, the more heat is produced through exothermic direct oxidation of $H_2S$.

However, reactor R1 should also mainly conduct the Claus reaction of $H_2S$ with sulfur dioxide ($SO_2$) so that the overall process of the invention efficiently removes $H_2S$.

Therefore, the optional first auxiliary oxygen-containing gas stream should only represent 0.1 to 19.9 vol. % of the total oxygen-containing gas stream supplemented in the process, preferably 0.5 to 9 vol. % and more preferably 1 to 5 vol. % of the total oxygen-containing gas flow supplemented in the process.

The optional flow rate of oxygen in the first auxiliary oxygen-containing gas stream, while always representing 0.1 to 19.9 vol. % of the total oxygen-containing gas stream supplemented in the process, can be adjusted to provide more or less heat to reactor R1 in order to ensure that the maximum temperature $T^{R1}_{max}$ in reactor R1 remains between 290 to 350° C., preferably 310 to 340° C., and more preferably 315 to 330° C.

In a preferred embodiment of the present invention, in order to maximize the amount of COS and $CS_2$ eliminated by hydrolysis and the $H_2S$ removal through Claus reaction in the reactor R1, the maximum temperature $T^{R1}_{max}$ in reactor R1 is maintained between 290 to 350° C., preferably 310 to 340° C., and more preferably 315 to 330° C. during the whole process.

If the maximum temperature $T^{R1}_{max}$ measured happens to be below 290° C., the flow rate of the optional first auxiliary oxygen-containing gas stream can be automatically increased. If the maximum temperature $T^{R1}_{max}$ is over 350° C., the flow rate of the optional first auxiliary oxygen-containing gas stream can be automatically decreased.

In a preferred embodiment, the flow rate of oxygen in the first auxiliary oxygen-containing gas stream at the entrance of the first reactor is proportional to the flow rate of oxygen in the main auxiliary oxygen-containing gas stream sent to the furnace of a proportionality factor (b). In this embodiment, the flow rate of oxygen in the main auxiliary oxygen-containing gas stream is fixed to maintain both the volumetric ratio of $H_2S$ in the $H_2S$-containing gas stream/$O_2$ in the main oxygen-containing gas stream above the stoichiometric value and the maximum temperature $T^{R1}_{max}$ in reactor R1 between 290 to 350° C. Any adjustment of the flow rate of the main oxygen-containing gas stream would therefore result in a simultaneous proportional adjustment of the flow rate of the first auxiliary oxygen-containing gas.

The catalyst system of reactor R1 should catalyze the Claus reaction of $H_2S$ with sulfur dioxide ($SO_2$) the hydrolysis of COS and $CS_2$ and optionally the direct oxidation of $H_2S$ with oxygen to sulfur.

Preferred catalyst used in the catalyst system of reactor R1 is titanium dioxide ($TiO_2$), but other usual catalysts, in particular $Al_2O_3$, cobalt molybdenum and/or nickel molybdenum can also be used. A further suitable catalyst is iron, but better results are achieved with titanium dioxide, cobalt molybdenum and nickel molybdenum, in particular with titanium dioxide.

Smartsulf in Reactor R1

However, since catalysts suitable for Claus reaction of $H_2S$, hydrolysis of COS and $CS_2$ and optionally direct oxidation of $H_2S$ are quite expensive, it may be desirable that reactor R1 be separated into two catalytic sections. This embodiment is known under the term SMARTSULF™ reactor.

Therefore, in a preferred embodiment, the reactor R1 is composed of two catalytic sections:
- a first section containing a first catalyst suitable hydrolysis of COS and/or $CS_2$ and optionally for direct oxidation of $H_2S$, preferably titanium dioxide ($TiO_2$), operated as an adiabatic bed without cooling at a maximum temperature $T^{R1}_{max}$, and
- a second section containing a second catalyst suitable for Claus reaction of $H_2S$, preferably $Al_2O_3$, operating as a pseudo-isotherm bed with an internal heat exchanger where the outlet temperature $T^{R1}_o$ is not higher and preferably lower than $T^{R1}_{max}$ but is higher than the dew point of the sulfur.

In this embodiment, the first section of the first reactor contains a first catalyst suitable for direct oxidation of $H_2S$ and/or hydrolysis of COS and/or $CS_2$ as previously described and no heat exchanger and is operated as an adiabatic bed without cooling. Here the temperature is kept at the maximum temperature $T^{R1}_{max}$ in the first section of the first reactor, and at this temperature the selective direct oxidation of hydrogen sulfide with oxygen is conducted in the presence of the catalyst contained in the adiabatic bed (as well as the hydrolysis of COS and $CO_2$).

After the reaction took place in the adiabatic bed, the gas stream containing remaining hydrogen sulfide+elemental sulfur+water+sulfur dioxide is then transferred to the second section of the first reactor. In the second section of the first reactor, a different catalyst is present than in the first section which catalyzes only the Claus reaction.

The second section of the first reactor contains a second catalyst suitable for Claus reaction of $H_2S$ and means for heating or cooling the gas (a heat exchanger). The outlet temperature of the second section of the first reactor is kept at a temperature $T^{R1}_o$ which is not higher and preferably lower than $T^{R1}_{max}$. $T^{R1}_o$ is preferably below 290° C. but is higher than the dew point of the sulfur. In the second section of the first reactor the Claus Eq. 1 reaction:

$$2H_2S+SO_2 \leftrightarrow 3/xS_x+2H_2O \qquad \text{Eq. 1}$$

occurs. This reaction is an equilibrium reaction, and the equilibrium is shifted to the side of the elemental sulfur the lower the temperature is. The outlet temperature $T^{R1}_o$ of the second section of the first reactor is kept above the dew point of the elemental sulfur, and thus, the equilibrium is not sufficiently shifted to the side of the elemental sulfur, but the sulfur is kept in gaseous form and thus does not deactivate the catalyst.

The dew point of the elemental sulfur decreases with the sulfur concentration in the gas. In the first section of the first reactor, the dew point of the elemental sulfur is generally between 220° C. and 250° C. Therefore, the outlet temperature $T^{R1}_o$ of the second section of the first reactor is preferably superior to the dew point of elemental sulfur but not greater than 290° C., for example 220° C.$\leq T^{R1}_o \leq$250° C. Preferably $T^{R1}_o$ is 1° C. to 20° C. above the sulfur dew point in reactor R1, preferably 5° C. to 10° C. above the sulfur dew point.

The second catalyst of reactor R1 contains a Claus catalyst that only catalyses the Claus reaction. Any known Claus catalyst, such as $Al_2O_3$ or $TiO_2$ can be used.

A main advantage of separating reactor R1 into two catalytic sections is to ensure the maximum hydrolysis of COS and $CS_2$ in the first section while improving the Claus reaction in the second section since the Claus reaction is favored at lower temperatures. This configuration of the reactors makes it possible to use less reactors in the overall process, preferably only 2 serially connected catalytic reactors to obtain a very high hydrogen sulfide removal, for example the sulfur recovery efficiency is more than 97 vol. % of $H_2S$, based on the initial amount of $H_2S$ present in the $H_2S$-containing gas stream treated by the process of the invention.

Step e

The claimed process further includes a step e) where the gas stream depleted in $H_2S$ leaving the reactor R1 is cooled by passing through a condenser where liquid sulfur is condensed and withdrawn and a gas stream depleted in sulfur is recovered.

A gas stream depleted in sulfur is thus obtained, wherein preferably 80 to 95 vol. % of the $H_2S$ contained in the $H_2S$-containing gas stream entering the process is converted.

Step f: Optional Other Reactors in Series

Succession of catalytic reactors associated with optional reheaters and sulfur condensers can be used to increase sulfur recovery.

The gas stream depleted in sulfur but still containing residual amounts of hydrogen sulfide and sulfur dioxide obtained from reactor R1 then optionally passes through a series of reactors, preferably 1 or 2, containing a catalyst system which catalyzes the Claus reaction of $H_2S$ with sulfur dioxide ($SO_2$) before reaching the last reactor R of the plant.

The temperature of the catalytic reactors is decreased with each additional reactor, but never below the sulfur dew point (about 220 to 250° C. at operating pressures) to avoid sulfur condensation inside reactors and possible catalyst deactivation. Lower temperature decreases Claus reaction kinetics, but allows Claus reaction to perform higher sulfur recovery rate.

Typical temperatures found at the outlet of second and third catalytic Claus reactors are about 240 and 200° C. respectively.

In this optional embodiment, an auxiliary oxygen-containing gas stream can be supplemented to the gas stream introduced in each reactor, and these reactors can contain a catalyst which performs both the direct oxidation of $H_2S$ with oxygen to sulfur and the Claus reaction of $H_2S$ with sulfur dioxide ($SO_2$). The gas stream depleted in $H_2S$ obtained at the exit of each reactor can be further transferred to a sulfur condenser to obtain a gas stream depleted in sulfur.

Step g

The process of the invention involves at least two serially connected reactors. The gas stream depleted in sulfur obtained from reactor R1 passes to the last reactor R together with a last auxiliary oxygen-containing gas stream.

The gas stream depleted in sulfur obtained in step e) or optionally in step f) may further pass through a heater located between the condenser of step e) or f) and the reactor R of step g).

The last reactor R contains a catalyst system which catalyzes both the direct oxidation of $H_2S$ with oxygen to sulfur and the Claus reaction of $H_2S$ with sulfur dioxide ($SO_2$), said reactor R being operated at a maximum temperature $T^R_{max}$ below the maximum temperature $T^{R1}_{max}$ of reactor R1.

Within the meaning of the invention, the last reactor is the last in which $H_2S$-containing gas stream enters in the process.

The last reactor R should maximize the conversion of $H_2S$ through Claus reaction so that the overall process of the invention efficiently removes $H_2S$.

It is however necessary to limit the amount of oxygen supplemented in the last reactor R since the addition of oxygen favors direct oxidation of $H_2S$ which, as previously indicated, is an exothermic reaction. However, the Claus reaction which should be maximized in the last reactor R is favored at lower temperatures and would therefore be affected by a rise in temperature due to direct oxidation of $H_2S$.

Therefore, the flow rate of oxygen in the last auxiliary oxygen-containing gas stream should only represent 0.1 to 4 vol. % of the total flow rate of the oxygen-supplemented in the process, preferably 0.1 to 2 vol. %, and more preferably 0.5 to 1.5 vol. % of the total flow rate of the oxygen supplemented in the process.

It can be noted that the last auxiliary oxygen-containing gas stream represents a negligible part of the total oxygen-containing gas stream supplemented in the process of the invention. This makes it possible to obtain faster $O_2$-adjustment in the last reactor since only a small amount of oxygen is required at this stage (supplementation of higher amounts of oxygen would require bigger valves, an thus longer reaction time of the system). This contributes to obtaining an increased reactivity of the system to supply the right amount of oxygen to the overall process, and this leads to an increased global accuracy of the oxygen demand in the process of the invention compared to a prior art processes supplementing oxygen only at the entrance of the process leading to greater sulfur recovery.

The flow rate of oxygen in the last auxiliary oxygen-containing gas stream, while always representing 0.1 to 4 vol. % of the total flow rate of the oxygen-containing gas stream supplemented in the process should preferably be adjusted to produce more or less $SO_2$ in reactor R in order to ensure that the volumetric ratio of $H_2S/SO_2$ at the exit of the last reactor R remains. from 1.9 to 2.2.

In a preferred embodiment of the present invention, in order to maximize the amount of $H_2S$ removal from the claimed process, the volumetric ratio of $H_2S/SO_2$ at the exit of the last reactor R is maintained from 1.9 to 2.2 during the whole process.

The flow rate of oxygen in the last auxiliary oxygen-containing gas stream is increased when the value of the volumetric ratio of $H_2S/SO_2$ measured in step i) is above 2, and is decreased when the volumetric ratio of $H_2S/SO_2$ measured in step i) is below 2.0.

Since it is not possible to remove 100% of the $H_2S$ contained in the acid gas fed to the process, there is always remaining $H_2S$ to measure the volumetric ratio of $H_2S/SO_2$ at the exit of the last reactor R.

If the oxygen demand in the last auxiliary oxygen-containing gas stream is higher than 2.5 vol. % of the total flow rate of the oxygen supplemented in the process, in particular from 2.8 to 4 vol. %, preferably from 3 to 3.6 vol. %, a signal can be sent to the main oxygen-containing gas stream to increase the flow rate of oxygen in the main oxygen-containing gas stream in proportion.

If the oxygen demand in the last auxiliary oxygen-containing gas stream is lower than 1.5 vol. %, of the total flow rate of the oxygen supplemented in the process, in particular from 0.1 to 1.5 vol. %, preferably from 0.4 to 1.2 vol. %, a signal can be sent to the main oxygen-containing gas stream to decrease the flow rate of oxygen in the main oxygen-containing gas stream in proportion.

Therefore, in the preferred embodiment previously disclosed where the flow rate of the first auxiliary oxygen-containing gas stream is proportional to the flow rate of the main auxiliary oxygen-containing gas stream of a proportionality factor (b) and the flow rate of the main auxiliary oxygen-containing gas stream is set to a fixed value, this fixed value of the flow rate of the main auxiliary oxygen-containing gas stream will however vary if the oxygen demand is higher than the maximal instruction range for the flow rate of the last auxiliary oxygen-containing gas stream.

The catalyst system of reactor R should catalyze the Claus reaction of $H_2S$ with sulfur dioxide ($SO_2$)

As already disclosed, suitable catalyst for the Claus reaction can be any known Claus catalyst, for example selected from titanium dioxide ($TiO_2$), cobalt molybdenum, nickel molybdenum, iron and/or $Al_2O_3$, preferably titanium dioxide ($TiO_2$).

The reactor R is operated at a maximum temperature $T^R_{max}$ below $T^{R1}_1$, and preferably the maximum temperature in the last reactor is ranging from 180 to 240° C., preferably 190 to 210° C.

Smartsulf in Reactor R

In a preferred embodiment, as previously described for reactor R1, the reactor R can be composed of two catalytic sections:

- a first section containing a first catalyst suitable for direct oxidation of $H_2S$, preferably titanium dioxide ($TiO_2$), operated as an adiabatic bed without cooling at a maximum temperature $T^R_{max}$ ranging from 180 to 240° C., preferably 190 to 210° C., and
- a second section containing a second catalyst suitable for Claus reaction of $H_2S$, preferably $Al_2O_3$, operating as a pseudo-isotherm bed with an internal heat exchanger where the outlet temperature $T^R_o$ is higher than water dew point and lower than sulfur dew point, preferably ranging from 105 to 140° C., and more preferably 110 to 125° C.

In this embodiment, the first section of the last reactor contains a first catalyst suitable for direct oxidation of $H_2S$ as described for reactor R1 and no heat exchanger and is operated as an adiabatic bed without cooling. The temperature in this first section of reactor R is kept at the maximum temperature $T^R_{max}$ ranging from 180 to 240° C., preferably 190 to 210° C.

It should be noted that catalysts that require an oxygen surplus cannot be considered suitable catalysts for direct oxidation of $H_2S$ since they require residual free oxygen available downstream the catalyst which would render any downstream control of the $H_2S/SO_2$ ratio useless.

After the reaction took place in the adiabatic bed, the gas stream containing remaining hydrogen sulfide+elemental sulfur+water+sulfur dioxide is then transferred to the second section of the last reactor. The second section of the last reactor contains a catalyst which catalyzes only the Claus reaction and means for heating or cooling the gas (a heat exchanger). The outlet temperature $T^R_o$ is higher than water dew point and lower than sulfur dew point in reactor R in order to condensate the elemental sulfur while avoiding simultaneous water condensation.

The dew point of the elemental sulfur decreases with the sulfur concentration in the gas. Considering that at the outlet of the last reactor R the concentration of sulfur is already low, at that part of the last reactor the dew point of elemental sulfur in reactor R is about 170° C. Thus, preferably the outlet temperature $T^R_o$ of the second section of the last reactor is ranging from 105 to 140° C., preferably 110 to 125° C.

In a preferred embodiment, the catalytic systems of both reactors R1 and R are separated into two catalytic sections. With this preferred embodiment, a very high hydrogen sulfide removal, for example more than 99.8 vol. % of $H_2S$, based on the initial amount of $H_2S$ present in the $H_2S$-containing gas stream treated by the process of the invention can be obtained with minimal installation costs. When optional Claus reactors are added in series between reactors R1 and R, they preferably contain a catalytic system separated into two catalytic sections.

Regeneration of the Catalyst

One disadvantage of operating the last reactor at such a low temperature is that the liquid or solid sulfur deposits on the catalyst and accumulates. Over time this leads to a deactivation of the catalyst. The gas leaving the second reactor is essentially free of hydrogen sulfide and can be further used or processed. After some time of operation the catalyst of the last reactor R is contaminated by liquid and/or solid elemental sulfur to such a degree that it can no longer sufficiently catalyze the Claus reaction.

In such situation, the operating conditions between the serially connected reactors are switched, and the gas flow is also switched so that the previous last reactor R is operated in the conditions of previous reactor R1, and the previous first reactor R1 is operated in the conditions of previous reactor R. Thus, now the previous last reactor R is operated at the maximum temperature $T^{R1}_{max}$ and at the outlet temperature $T^{R1}_o$ previously defined for R1, and the previous first reactor R1 is operated at the temperatures $T^R_{max}$ and $T^R_o$. The gas streams are also switched so that the gas stream to be desulfurized is now transferred to the previous last reactor R. Accordingly, the previous first reactor is now operated at the temperatures of the previous last reactor and thus acts in the same way as the previous last reactor. Essentially, by switching the operation conditions and the gas flow, the previous last reactor now becomes the first reactor, and the previous first reactor now becomes the last reactor. The elemental sulfur deposited on the catalyst in the previous last reactor is desorbed at the new temperatures of operation and leaves the previous last reactor essentially with the gas stream which is transferred to the sulfur condenser.

The switch is repeated when the catalyst in the "new" last reactor is inactivated by the deposited sulfur.

The switching process of the gases between the first and the last reactor can be done by usual and known distributors. Preferred devices for effecting the switching process are disclosed and described in DE 10 2010 034 070, the content of which is included herein by reference.

When high sulfur recovery rate is sought, the time necessary to switch-over the sulfur loaded reactor R into the position of the reactor R1 and vice versa can lead to an important loss in sulfur recovery due to the sudden change of operating conditions. In addition, during this switch-over, the air demand of the reactors necessarily varies. This leads to a transitory period where the sulfur recovery rate decreases. According to the invention, however, the actual air demand of the last reactor R can be adjusted within seconds after the switch of reactors positions. This reduces the duration of the transitory period and ensures that even during the switch of reactors positions, the sulfur recovery rate remains constantly high.

In particular, the volumetric ratio of $H_2S/SO_2$ at the exit of the new last catalytic reactor R reaches the desired value from 1.9 and 2.2 within 1 seconds to 2 minutes during the whole process and in particular after the switch of the reactors by adjustment of the flow rate of the last auxiliary oxygen-containing gas stream.

Step h

The claimed process can optionally further includes a step h) where the gas stream depleted in $H_2S$ leaving the last reactor R is cooled by passing through a condenser where liquid sulfur is condensed and withdrawn and a gas stream depleted in sulfur is recovered. If reactor R is operated below the sulfur dew point, as in the SMARTSULF™ embodiment previously described, no downstream condenser is needed, as this would not increase the sulfur recovery rate.

Thanks to the process of the invention, the sulfur recovery efficiency is above 99 vol. %, more preferably above 99.5 vol %, and even more preferably up to 99.8 vol. % of $H_2S$ or above, based on the initial amount of $H_2S$ present in the $H_2S$-containing gas stream.

In a preferred embodiment of the invention, the process contains two serially connected reactors, each composed of two catalytic sections: the first section suitable for direct oxidation of $H_2S$ and the second section suitable for Claus reaction, wherein the operating conditions between the two reactors can be switched in order to ensure regeneration of the catalyst.

Step i)

The claimed process further includes a step i) of measurement of the volumetric ratio of $H_2S/SO_2$ at the exit of the last catalytic reactor R.

The volumetric ratio of $H_2S/SO_2$ at the exit of the last reactor R can be measured by well-known Air Demand Analyzers, also called ADA.

By controlling that the volumetric ratio of $H_2S/SO_2$ at the exit of the claimed process remains around the stoichiometry of the Claus reaction of 2, in particular from 1.9 and 2.2, the conversion of $H_2S$ can be further improved. As previously explained, the inventors have unexpectedly found that by supplementing the last reactor of the process with a last auxiliary oxygen-containing gas stream in a specific flow rate of oxygen, it was possible to control in a precise and very reactive manner the volumetric ratio of $H_2S/SO_2$ at the exit of the last reactor R of the claimed process.

Therefore, thanks to the specific and sensitive control of the oxygen supplemented in the different steps of the claimed process, it is possible to provide a high desulfurization that is stable over time, and to easily compensate any variation in the composition of the $H_2S$-containing gas stream. Indeed, any variation of the volumetric ratio of $H_2S/SO_2$ from the stoichiometry detected at the exit of the last reactor R would immediately be compensated by an adjustment of the oxygen supplemented at the entry of the last reactor. In addition, if the oxygen demand at the entry of the last reactor is higher that the maximal instruction range set for the process, an increase of the flow rate of the main oxygen-containing will be ordered. In the same manner, if the oxygen demand at the entry of the last reactor is lower that the minimal instruction range set for the process, a decrease of the flow rate of the main oxygen-containing will be ordered. This oxygen supplement control ensures that the Claus reaction is operated in the best conditions with a minimal delay in the adjustment regarding the oxygen demand, thus maximizing the $H_2S$ removal.

The present invention also encompasses a method for controlling the volumetric ratio of $H_2S/SO_2$ at the exit of a sulfur recovery unit with the process described above.

DETAILED DESCRIPTION OF THE DRAWINGS

Figure 1:
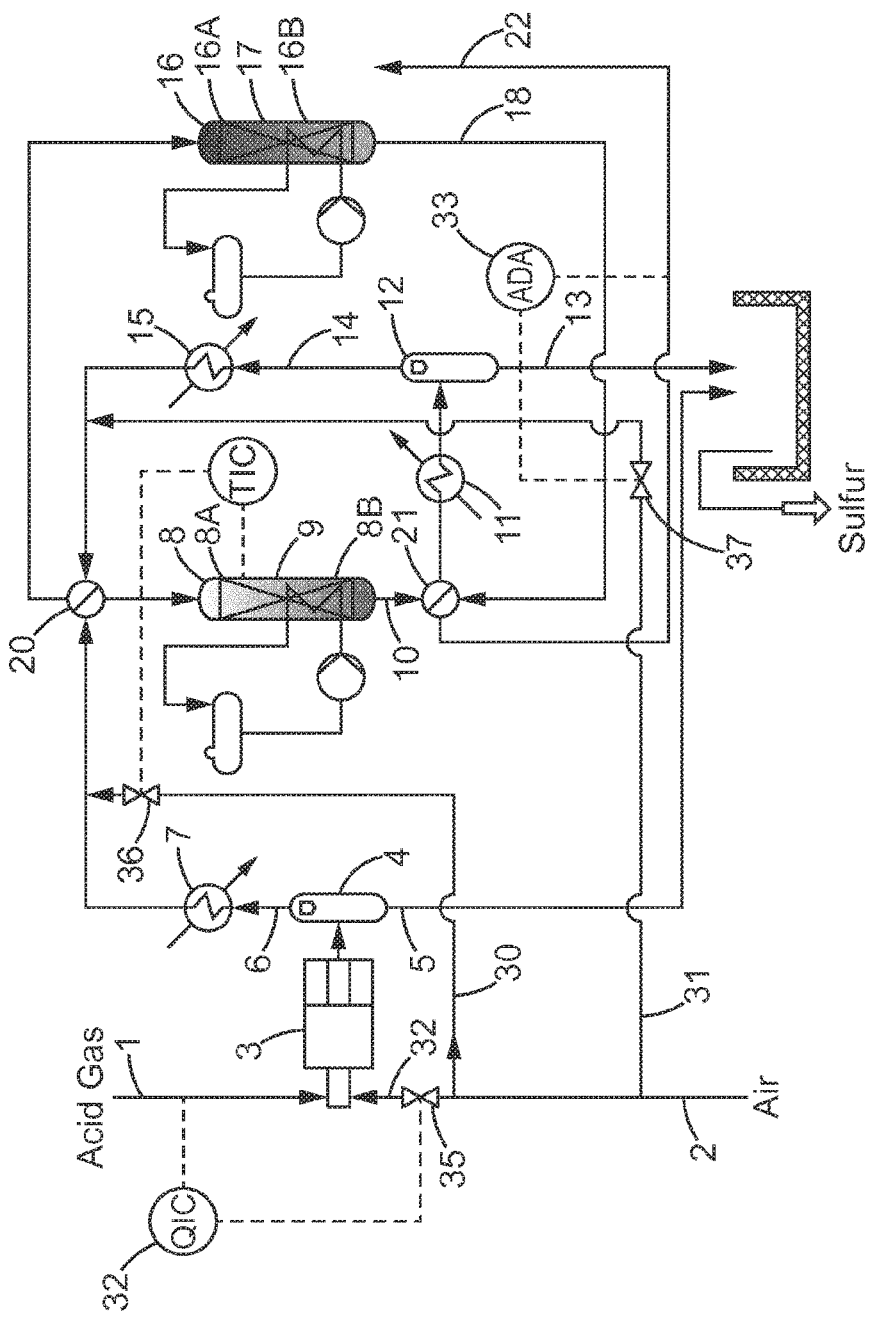
FIG. 1, a process involving the oxygen control according to the invention in a SMARTSURF™ preferred embodiment is illustrated.

Referring now to FIG. 1, a process involving the oxygen control according to the invention in a SMARTSULF™ preferred embodiment is illustrated.

The $H_2S$-containing gas stream (line 1) is mixed with a main oxygen-containing gas stream (line 2) and introduced in a furnace (3) without catalyst.

The $H_2S$ flow rate in the feed gas is measured and the flow rate of the main oxygen-containing gas stream sent to the furnace is controlled in proportion to this value. The content of $H_2S$ in the feed gas is measured by an Analysis Indicator Control QIC (32 in FIG. 1) as well as the flow rate of the $H_2S$-containing gas stream (not shown), which gives the flow rate of $H_2S$ introduced in the furnace. The flow rate of the main oxygen-containing gas stream sent to the furnace is controlled by the main air valve in proportion to the $H_2S$ flow rate.

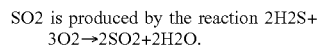

The stream of gas leaving the furnace thus contains $SO_2$, remaining $H_2S$, and impurities generated in the furnace such as COS, $CS_2$ . . . .

The stream is cooled by passing through a condenser (4) where liquid sulfur is condensed and withdrawn (line 5), and the stream of gas is recovered at the top of the condenser (line 6) at a temperature of about 130° C. The sulfur removed corresponds to 50-70% of the sulfur present initially in the acid gases.

The recovered stream of gas is reheated in one or more heater (7) and optionally mixed with a first auxiliary oxygen-containing gas stream (through valve 36 and line 30) before entering the first reactor (8). This first reactor (8) is filled with titanium oxide or another suitable catalyst bed (9) which catalyzes both the Claus reaction of $H_2S$ with sulfur dioxide ($SO_2$), the hydrolysis of COS and $CS_2$ and optionally the direct oxidation of $H_2S$ with oxygen to sulfur. Usually the temperature of the first reactor (8) reaches 315 to 330° C. which is of particular interest to better achieve the hydrolysis of COS and $CS_2$ which is improved at such high temperature.

The first auxiliary oxygen-containing gas stream sent to the first catalytic reactor (through valve 36 and line 30) is controlled with the maximal temperature reached in the reactor (350° C.) through the Temperature Indicator Control (TIC) device which controls the opening of valve (36). Indeed, residual $H_2S$ oxidizes with oxygen coming from line 30 when contacted with the $TiO_2$ based catalyst in reactor (8). This reaction is exothermic and results in an increase of the reactor's (8) temperature. Sufficiently high temperatures can be obtained thus permitting COS and CS2 hydrolysis, and this is of particular interest if the heater (7) is unable to provide high enough temperature in a simple and economic manner.

The separation of the catalytic system of reactor (8) into two sections (SMARTSULF™ reactor) is of particular interest in this configuration. In this embodiment, the first adiabatic area (8A) of the reactor can be operated at high temperature (290-340° C.) to enhance previously said hydrolysis, and the second pseudo-isotherm area (8B) can be operated at much lower temperature (200-280° C.) to improve sulfur recovery rate through Claus reaction. An external or internal heat exchanger (thermoplates for example) ensures the cooling of the second area which behaves as pseudo-isotherm.

Depending on the maximal acceptable sulfur residual concentration, extra catalytic reactors can be added in order to decrease the $H_2S$ concentration in the treated vapor effluent (not shown on the figure).

The stream of gas leaving the first reactor (8) containing $SO_2$ and remaining $H_2S$ is cooled by passing through a condenser (11) and a sulfur trap (12) where liquid sulfur is condensed and withdrawn (line 13), and the stream of gas is recovered at the top of the condenser (line 14) at a temperature of about 130° C. The sulfur removed corresponds to 80 to 95 vol. % of $H_2S$, based on the initial amount of $H_2S$ present in the $H_2S$-containing gas stream treated.

The recovered stream of gas is reheated in one or more heater (15) and mixed with a last auxiliary oxygen-containing gas stream (through valve 37 and line 31) before entering the last reactor. This last reactor (16) is filled with titanium oxide or another suitable catalyst bed (17) which catalyzes both the direct oxidation of $H_2S$ with oxygen to sulfur and the Claus reaction of $H_2S$ with sulfur dioxide ($SO_2$).

The separation of the catalytic system of reactor (16) into two sections (SMARTSULF™) is of particular interest in this configuration. In this embodiment, the first adiabatic area (16A) of the reactor can be operated at a temperature ranging from 180 to 240° C., and the second pseudo-isotherm area (16B) can be operated at much lower temperature (105 to 140° C.) to improve sulfur recovery rate through Claus reaction. An external or internal heat exchanger (thermoplates for example) ensures the cooling of the second area which behaves as pseudo-isotherm.

The volumetric ratio of $H_2S/SO_2$ at the exit of the last reactor R is measured by well-known Air Demand Analyzers, also called ADA (33 in FIG. 1). Deviation from the stoichiometric value, i.e from the instruction range of $H_2S/SO_2$ volumetric ratio of 1.9 to 2.2, is rectified by a signal to the air valve (37) which will adjust the flow rate of the last auxiliary oxygen-containing gas.

Since the last auxiliary oxygen-containing gas stream is much smaller than the main oxygen-containing gas stream it can react a lot faster and thus allows a much more precise control of the $H_2S/SO_2$ ratio.

As previously indicated, the specific distribution and control of the oxygen supplemented in the claimed process improved the sulfur recovery rate of a conventional Claus unit substantially. Additionally, the long-term average values were also improved.

Downstream effluent (line 18) can be cooled by passing through a condenser where liquid sulfur (not shown) is condensed and then the effluent is withdrawn (line 22).

It is conventional to separate the sulfur which leaves the reactor in gaseous form in a downstream condenser. According to another configuration of the invention illustrated in FIG. 1, a common sulfur condenser can be used for each two reactors by using a multiway valve (21) being installed between a first reactor and the downstream sulfur condenser. This means that the installed sulfur condenser is always flowed through in the same direction regardless of the position of the reactors.

It is possible to easily regenerate the catalyst in the process of the invention. To do so, two 4 way valves (20-21) are connected to the entrance and the exit of both SMARTSULF™ reactors, and allow to switch the position of the reactors. There is in this configuration, most preferably a unique condenser (12) to collect liquid sulfur. The first reactor is working above the sulfur dew point and needs the condenser (12) to collect sulfur as liquid element. Then the last reactor is working at sub dew point, to be able to form sulfur from lower $H_2S$ and $SO_2$ partial pressures. This last reactor accumulates liquid sulfur which condenses on the catalyst, thus after some time plugging the process. Liquid sulfur condensed on the catalyst needs to be evaporated (warm-up of the reactor) to allow the catalyst being fully regenerated. This step is done by switching the position of the two reactors together with the internal cooling. Directly after the switching the temperature of the previous last (cold) reactor is increased, allowing the liquid sulfur to evaporate and to be further recovered after being cooled down in the condenser (12).

Figure 2:
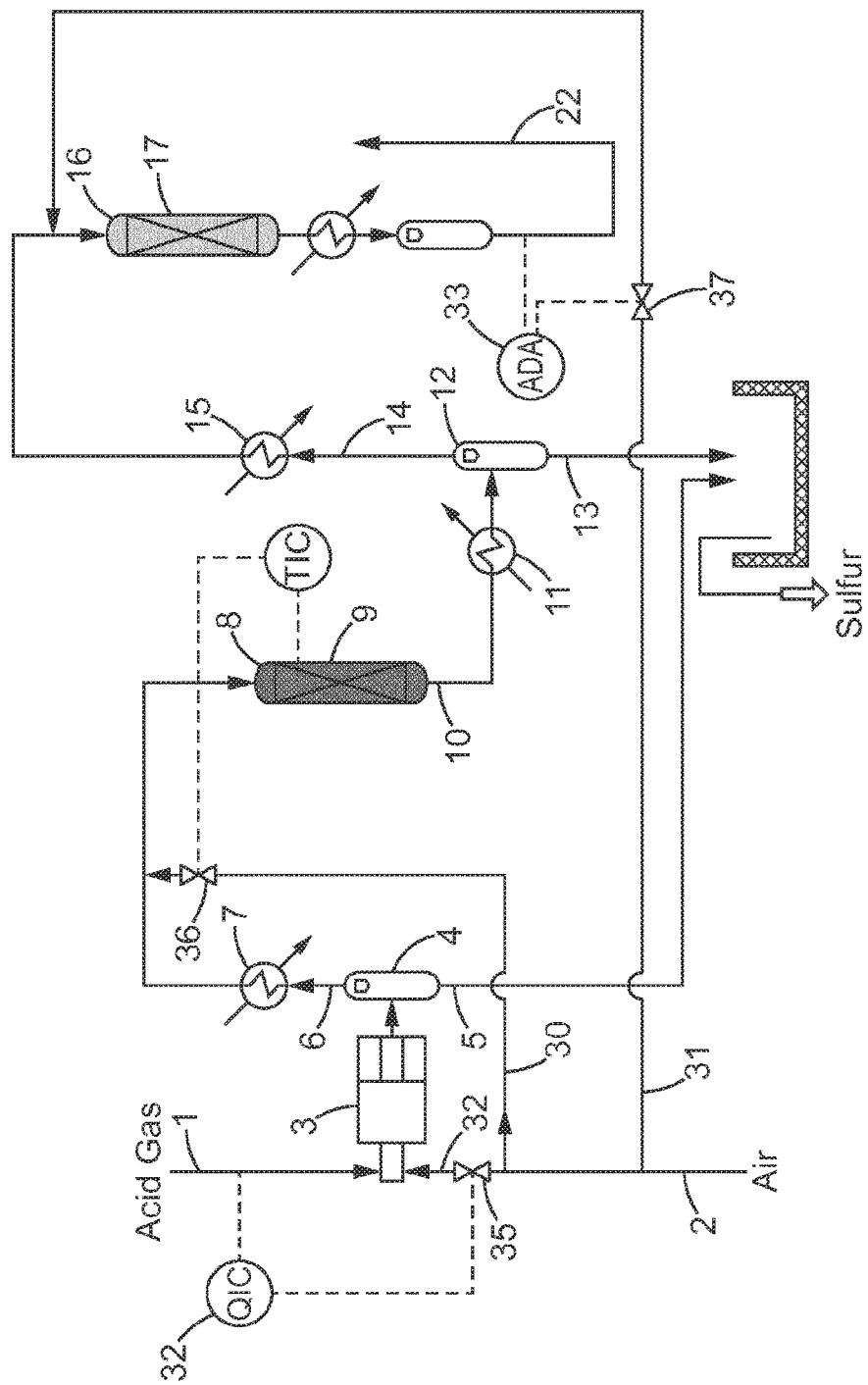
FIG. 2, a process involving the oxygen control according to the invention in a classic Claus Unit (without SMARTSURF™ reactor) is illustrated.

Referring now to FIG. 2, a process involving the oxygen control according to the invention in a classic Claus Unit (without SMARTSULF™ reactor) is illustrated.

In this embodiment, the difference with FIG. 1 is that both catalytic reactors (8) and (16) are adiabatic and contain no internal heat exchanger to control the temperature. The temperature in the first reactor (8) is therefore between 290-350° C. at the outlet, and the temperature in the last reactor (16) is between 180-240° C. at the outlet.

In addition, in this embodiment, it is not possible to regenerate the catalyst in the process of the invention since no 4-way valves (20-21) are connected to the entrance and the exit of the reactors. Therefore, the reactors should not operate below the dew point of elementary sulfur to avoid sulfur condensation on the catalyst and thus, plugging of the whole process.

The control of the oxygen distribution in this classic Claus unit provides better desulfurization than what would be obtained in the same unit without oxygen supplement.

However, the process of the invention is operated in the best conditions in the preferred embodiment illustrated in FIG. 1, thus maximizing the $H_2S$ removal.

The invention claimed is:

1. A process for the removal of hydrogen sulfide ($H_2S$) from a $H_2S$-containing gas stream through two or more serially connected catalytic reactors, which process comprises:
   a) mixing the $H_2S$-containing gas stream with a main oxygen-containing gas stream to obtain a gas stream containing both $H_2S$ and oxygen,
   b) introducing the obtained gas stream containing both $H_2S$ and oxygen into a furnace whereby a gas stream depleted in $H_2S$ is obtained,
   c) transferring the gas stream depleted in $H_2S$ to a sulfur condenser to obtain a gas stream depleted in sulfur,
   d) introducing the gas stream depleted in sulfur, optionally together with a first auxiliary oxygen-containing gas stream, into a first catalytic reactor R1 containing a catalyst system which catalyzes the Claus reaction of $H_2S$ with sulfur dioxide ($SO_2$), the hydrolysis of COS and $CS_2$ and optionally direct oxidation of $H_2S$ with oxygen to sulfur, said reactor being operated at a maximum temperature $T^{R1}_{max}$ between 290 and 350° C., whereby a gas stream depleted in $H_2S$ is obtained,
   e) transferring the gas stream depleted in $H_2S$ to a sulfur condenser to obtain a gas stream depleted in sulfur,
   f) optionally introducing the gas stream depleted in sulfur obtained from reactor R1 through a series of reactors and condensers, each reactor containing a catalyst system which catalyzes the Claus reaction of $H_2S$ with sulfur dioxide ($SO_2$) before reaching a last reactor R of the process,
   g) introducing the gas stream depleted in sulfur together with a last auxiliary oxygen-containing gas stream into the last catalytic reactor R containing a catalyst system which catalyzes the Claus reaction of $H_2S$ with sulfur dioxide ($SO_2$) and the direct oxidation of $H_2S$ with oxygen to sulfur, said reactor being operated at a maximum temperature $T^R_{max}$ below the maximum temperature $T^{R1}_{max}$ of reactor R1, whereby a gas stream depleted in $H_2S$ is obtained, h) optionally transferring the gas stream depleted in $H_2S$ to a sulfur condenser to obtain a gas stream depleted in sulfur, i) measuring the volumetric ratio of $H_2S/SO_2$ at the exit of the last catalytic reactor R, wherein the flow rate of oxygen in the main oxygen-containing gas stream and in the optional auxiliary oxygen-containing gas streams represents 96 to 99.9 vol. % of the total flow rate of the oxygen supplemented in the process, the flow rate of oxygen in the last auxiliary oxygen-containing gas stream represents 0.1 to 4 vol. % of the total flow rate of the oxygen supplemented in the process, and wherein the flow rate of oxygen in the last auxiliary oxygen-containing gas stream is adjusted depending on the value of the volumetric ratio of $H_2S/SO_2$ measured at the exit of the last catalytic reactor R in i) so that the volumetric ratio of $H_2S/SO_2$ measured in i) remains between 1.9 and 2.2.

2. The process according to claim 1, wherein the flow rate of oxygen in the last auxiliary oxygen-containing gas stream is increased when the value of the volumetric ratio of $H_2S/SO_2$ measured in i) is above 2, and is decreased when the volumetric ratio of $H_2S/SO_2$ measured in i) is below 2.0.

3. The process according to claim 1, wherein, in a), the flow rate of oxygen in the main oxygen-containing gas stream and in the optional auxiliary oxygen-containing gas streams is calculated so that the volumetric ratio of $H_2S$ in the $H_2S$-containing gas stream/$O_2$ in the oxygen-containing gas stream be above the stoichiometric value of the reactions operated in the furnace of 2.

4. The process according to claim 3, wherein the volumetric ratio of $H_2S$ in the $H_2S$-containing gas stream/$O_2$ in the main oxygen-containing gas stream is maintained at 2.002 to 2.5 during the whole process.

5. The process according to claim 1, wherein the furnace is operated at a temperature of 900° C. to 1400° C.

6. The process according to claim 1, wherein the gas stream depleted in sulfur obtained in c) further passes through a heater located between the condenser of c) and the reactor R1 of d).

7. The process according to claim 1, wherein the flow rate of oxygen in the first auxiliary oxygen-containing gas stream is adjusted to ensure that the maximum temperature $T^{R1}_{max}$ in reactor R1 remains between 290 to 350° C.

8. The process according to claim 7, wherein the temperature $T^{R1}_{max}$ in reactor R1 is maintained between 290 to 350° C.

9. The process according to claim 1, wherein the catalyst system of reactors R1 and R comprises at least one catalyst that is titanium dioxide ($TiO_2$), cobalt molybdenum, nickel molybdenum, iron, $Al_2O_3$, or a mixture thereof.

10. The process according to claim 1, wherein the reactor R1 comprises two catalytic sections:

a first section containing a first catalyst suitable for direct oxidation of $H_2S$ and/or hydrolysis of COS and/or $CS_2$, operated as an adiabatic bed without cooling at a maximum temperature $T^{R1}_{max}$, and a second section containing a second catalyst suitable for Claus reaction of $H_2S$, operating as a pseudo-isotherm bed with an internal heat exchanger where the outlet temperature $T^{R1}_o$ is not higher than $T^{R1}_{max}$ but is higher than the dew point of the sulfur.

11. The process according to claim 1, wherein the gas stream depleted in sulfur obtained in e) further passes through a heater located between the condenser of e) or f) and the reactor R of g).

12. The process according to claim 1, wherein the volumetric ratio of $H_2S/SO_2$ at the exit of the last reactor R is maintained from 1.9 to 2.2 during the whole process.

13. The process according to claim 1, wherein the reactor R is composed of two catalytic sections:

a first section containing a first catalyst suitable for direct oxidation of $H_2S$, operated as an adiabatic bed without cooling at a maximum temperature $T^R_{max}$ from 180 to 240° C., and a second section containing a second catalyst suitable for Claus reaction of $H_2S$, operating as a pseudo-isotherm bed with an internal heat exchanger where the outlet temperature $T^R_o$ is higher than water dew point and lower than sulfur dew point.

14. The process according to claim 1, wherein the operating conditions between the serially connected reactors are switched, and the gas flow is also switched so that the previous last reactor R is operated in the conditions of previous reactor R1, thus becoming new reactor R1, and the previous first reactor R1 is operated in the conditions of previous reactor R, thus becoming new reactor R.

15. The process according to claim 1, wherein the volumetric ratio of $H_2S/SO_2$ at the exit of the new last catalytic reactor R reaches the desired value between 1.9 and 2.2 within 1 seconds to 2 minutes during the whole process.

16. The process according to claim 1, having a sulfur recovery efficiency above 99 vol. % based on the initial amount of $H_2S$ present in the $H_2S$-containing gas stream treated.

17. The process according to claim 1, wherein if oxygen demand in the last auxiliary oxygen-containing gas stream is higher than 2.5 vol. % of the total flow rate of the oxygen supplemented in the process a signal is sent to the main oxygen-containing gas stream to increase the flow rate of oxygen in the main oxygen-containing gas stream in proportion.

18. The process according to claim 1, wherein if oxygen demand in the last auxiliary oxygen-containing gas stream is lower than 1.5 vol. %, of the total flow rate of the oxygen supplemented in the process a signal is sent to the main oxygen-containing gas stream to decrease the flow rate of oxygen in the main oxygen-containing gas stream in proportion.

19. The process according to claim 10, wherein the first catalyst is $TiO_2$ and the second catalyst is $Al_2O_3$.

20. The process according to claim 13, wherein the first catalyst is $TiO_2$ and the second catalyst is $Al_2O_3$.

21. The process according to claim 15, wherein reaches R reaches the desired value after the switch of the reactors by adjustment of the flow rate of the last auxiliary oxygen-containing gas stream.

* * * * *